United States Patent
Inoue et al.

(10) Patent No.: US 6,395,390 B1
(45) Date of Patent: May 28, 2002

(54) SHEET FOR PROTECTING PAINT FILMS OF AUTOMOBILES

(75) Inventors: Tsuyoshi Inoue; Kenichi Shibata; Kenji Sano; Akira Wakabayashi; Keiji Hayashi; Shuuji Sugimoto, all of Osaka; Komaharu Matsui, Kanagawa; Takeshi Eda; Hiroshi Ueda, both of Hyogo, all of (JP)

(73) Assignees: Nitto Denko Corporation, Osaka; Kansai Paint Co., Ltd., Hyogo, both of (JP)

( * ) Notice: Subject to any disclaimer, the term of this patent is extended or adjusted under 35 U.S.C. 154(b) by 0 days.

(21) Appl. No.: 09/406,815

(22) Filed: Sep. 28, 1999

(30) Foreign Application Priority Data

Oct. 7, 1998 (JP) ............................................. 10-301635

(51) Int. Cl.[7] ............................... C09J 7/04; C09J 7/02; B32B 27/12
(52) U.S. Cl. ........................ 428/343; 442/149; 442/150; 442/151
(58) Field of Search ............................. 428/343, 355 R; 442/149, 150, 151

(56) References Cited

U.S. PATENT DOCUMENTS

| | | | | |
|---|---|---|---|---|
| 5,601,917 A | | 2/1997 | Matsui et al. ................ | 428/356 |
| 5,612,135 A | | 3/1997 | Matsui et al. ................ | 428/343 |
| 5,650,215 A | * | 7/1997 | Mazurek et al. ............. | 428/156 |
| 5,747,132 A | | 5/1998 | Matsui et al. ................ | 428/41.7 |
| 5,810,960 A | | 9/1998 | Matsui et al. ................ | 156/305 |

FOREIGN PATENT DOCUMENTS

| | | | | |
|---|---|---|---|---|
| DE | 297 07 154 U1 | * | 8/1998 | |
| EP | 0 336 727 A | | 11/1989 | |
| EP | 0 881 272 A1 | | 12/1998 | |
| EP | 0 887 393 A2 | | 12/1998 | |
| JP | 2-199184 | | 8/1990 | .......... C09J/115/00 |
| JP | 6-73352 | | 3/1994 | .............. C09J/7/02 |
| WO | WO 95/11945 | | 5/1995 | |

* cited by examiner

Primary Examiner—Daniel Zirker
(74) Attorney, Agent, or Firm—Sughrue Mion, PLLC

(57) ABSTRACT

A sheet for protecting paint films of automobiles which can prevent the paint film of automobiles from suffering from damages such as discoloration and denaturation even if rainwater or washer penetrates into the gap between the adhesive cover and the paint film while achieving excellent protection function to suspended matters, colliding matters, etc. inherent to protecting sheets and being easily peeled off and removed after completion of the desired protection. The sheet for protecting paint films of automobiles comprises a pressure-sensitive adhesive layer having a roughened surface provided on a substrate made of fiber sheet. Even when rainwater, washer, etc. penetrates into the gap between the pressure-sensitive adhesive layer and the paint film of automobiles from wrinkles formed thereon, the liquid diffuses by capillary action through the gap developed by the roughened pressure-sensitive adhesive layer, making it possible to avoid the residence and concentration of the penetrated dirty water and hence prevent the occurrence of damages such as discoloration and denaturation of the paint film. Further, the arrangement of a pressure-sensitive adhesive layer having a roughened surface reflecting the fiber constituting the protecting sheet, particularly a fibrous continuous roughened surface, makes it possible to further diffuse the contaminating dirty water and hence further avoid the retention and concentration of the penetrated dirty water. Thus, the damages on the paint film can be more securely prevented.

4 Claims, 1 Drawing Sheet

FIGURE
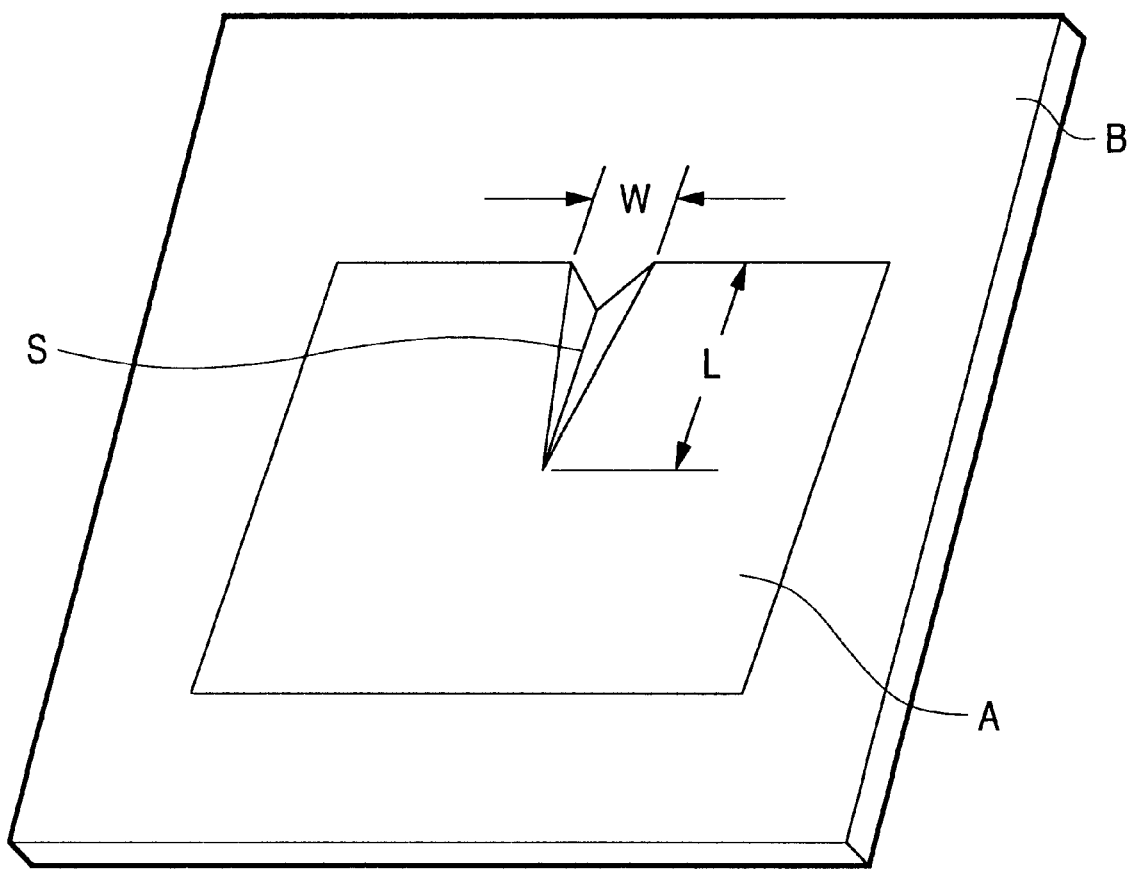

SHEET FOR PROTECTING PAINT FILMS OF AUTOMOBILES

FIELD OF THE INVENTION

The present invention relates to a sheet for protecting paint films of automobiles., which prevents paint films of automobiles from denaturation and discoloration and thus appropriately protects the surface of bodies or parts of automobiles.

BACKGROUND OF THE INVENTION

When loading automobiles, the parts thereof, etc., just finished painting on trucks or ships and transporting remote places such as overseas, etc., it has been a practice to coat the automobiles, the parts thereof, etc., with coating material containing wax as the main components to give a thickness of 5 to 40 μm so as to prevent them from being damaged, frosted, discolored, etc., by various floating matters and colliding matters such as dirts, dusts and rainwater. However, this method suffers from some problems, for example, that uniform protection can be hardly achieved thereby due to difficulties in forming a wax coating film of a uniform thickness; that the paint film may be easily stained; that the paint film is liable to be damaged by acid rain; that the wax, etc. would ooze out onto the paint film and thus cause discoloration, etc.; that a large labor is required in forming the paint film; and that use of a solvent and the waste liquid treatment frequently cause environmental problems.

On the other hand, there are known various surface protecting sheets comprising a pressure-sensitive adhesive layer provided on a support. As protecting sheets for painted adherends having films there are proposed ones provided with radiation-cured pressure-sensitive adhesive layers having a lowered glass transition point or polyisobutyrene-based rubber pressure-sensitive adhesive layers in JP-A-2-199184 (The term "JP-A" as used herein means an "unexamined published Japanese patent application") and JP-A-6-73352. The above-mentioned problems can be solved by using this sheet-like system.

However, the conventional protecting sheets suffer from a problem that when these sheets are peeled off from paint films of automobiles after used, there arise hardly repairable damages such as discoloration and denaturation of the paint films.

To overcome these problems, the present inventors have conducted extensive studies and, as a result, found that the above-mentioned damages occur based on the following mechanism. Namely, rainwater or washing liquor such as window washer penetrates into a gap between a pressure-sensitive layer and a paint film through wrinkles which have been unavoidably formed in adhering a protecting sheet to the paint film of automobiles. The liquid then retains in the air bubbles entrapped in the gap and concentrates therein due to the evaporation of moisture, thus causing the damages such as discoloration and denaturation of the paint film of automobiles.

SUMMARY OF THE INVENTION

It is therefore an object of the present invention to provide a sheet for protecting paint films of automobiles, which can prevent the paint film of automobiles from suffering from damages such as discoloration and denaturation even if rainwater or washer penetrates into the gap between the pressure-sensitive layer of the protecting sheet and the paint film while achieving excellent protection function to suspended matters, colliding matters, etc., inherent to protecting sheets and being easily peeled off and removed after completion of the desired protection.

The foregoing object of the present invention will become apparent from the following detailed description and examples.

The present invention provides a sheet for protecting paint films of automobiles, comprising a pressure-sensitive adhesive layer having a roughened surface provided on a substrate made of a fiber sheet.

BRIEF DESCRIPTION OF THE DRAWING

By way of example and to make the description more clear, reference is made to the accompanying drawing in which:

The FIGURE is an explanatory view showing a dirty water diffusion test, etc., wherein the symbol A represents a sheet for protecting paint films, the symbol S represents a wrinkle portion, and the symbol B represents a resin plate.

DETAILED DESCRIPTION OF THE INVENTION

In accordance with the present invention which provides a sheet for protecting paint films of automobiles, even when rainwater, washer, etc., penetrate into the gap between the pressure-sensitive adhesive layer of the protecting sheet and the paint film of automobiles from wrinkles formed on the pressure-sensitive layer of the protecting sheet, the liquid diffuses by capillary action through the gap developed by the roughened pressure-sensitive adhesive layer, making it possible to avoid the retention and concentration of the penetrated dirty water and hence prevent the occurrence of damages such as discoloration and denaturation of the paint film. Further, the arrangement of the pressure-sensitive adhesive layer having a roughened surface reflecting the fiber constituting the protecting sheet, particularly a fibrous continuous roughened surface, makes it possible to further diffuse the penetrated dirty water and hence further avoid the retention and concentration of the penetrated dirty water. Thus, the damages on the paint film can be more securely prevented. Further, since the roughened surface can be hardly ruptured, the above effect can be stably maintained over an extended period of time.

Accordingly, a sheet for protecting paint films of automobiles can be obtained which can prevent the paint film of automobiles from suffering from damages by penetration of dirty water while achieving the desired function of protecting the paint film of automobiles from suspended matters, colliding matters, etc., and being easily and smoothly peeled and removed.

The sheet for protecting paint films of automobiles according to the present invention comprises a pressure-sensitive adhesive layer having a roughened surface provided on a substrate made of fiber sheet. From the standpoint of the diffusibility of penetrated dirty water, the pressure-sensitive adhesive layer has a surface roughness of preferably 2 μm or more, more preferably 3 μm or more, and most preferably 5 to 100 μm, based on Ra according to JIS B 0601 and/or preferably 20 μm or more, more preferably 30 μm or more, and most preferably 50 to 500 μm, based Rmax according to JIS B 0601.

If Ra as defined above is less than 2 μm or Rmax as defined above is less than 20 μm, retention of penetrated dirty water may occur due to poor diffusion of the penetrated dirty water. On the other hand, if Ra exceeds 100 μm or Rmax exceeds 500 μm, a sufficient adhesive force may not be exhibited in the protecting sheet for paint films of automobiles due to insufficient adhered area.

From the standpoint of high diffusibility of penetrated dirty water and prevention of residual sheet mark, the preferable pressure-sensitive adhesive layer is one having a fibrous roughened surface, particularly a roughened surface reflecting the shape of fibers of a fiber sheet constituting a substrate, e.g., fibrous continuous roughened surface such as continuous groove formed by the entanglement of short fiber-like grooves as in the surface structure of non-woven fabric. A dotted surface such as embossed surface reflecting the shape of an embossed substrate are difficult to be ruptured when the protecting sheet is covered on the paint films. However, when the protecting sheet is peeled off from the paint film of automobiles, the embossed shape may be retain on the paint film. The retention of this sheet mark is particularly remarkable when the paint film of automobiles is soft.

The pressure-sensitive adhesive layer can be formed using an appropriate pressure-sensitive adhesive such as rubber-based or acrylic pressure-sensitive adhesive. The kind of the pressure-sensitive adhesive layer used is not specifically limited. If the rubber-based pressure-sensitive adhesive is used, it is preferable to use a rubber-based polymer free of aliphatic unsaturated bond or having a small content of such an aliphatic unsaturated bond from the standpoint of a long-term stabilization of performance.

Examples of the rubber-based polymer include polyisobutyrene, butyl rubber, A-B-A type block polymer such as styrene-ethylene/butylene copolymer-styrene (SEBS), styrene-ethylene/propylene copolymer-styrene (SEPS), styrene-butadiene-styrene (SBS) or styrene-isoprene-styrene (SIS), and hydrogenation product thereof, and ethylene-vinyl acetate copolymer.

The pressure-sensitive adhesive can be prepared using at least one of base polymers. In particular, the pressure-sensitive adhesive prepared using at least two base polymers each having different molecular weight distribution is preferable. Where the A-B-A type block copolymer is used, A-B-A type block polymers each having different molecular weight distribution may be used in combination; A-B-A type block polymers each having different styrene content may be used in combination; or the A-B-A type block polymer may be used in combination with A-B type diblock polymers such as styrene-ethylene/butyrene copolymer (SEB), styrene-ethylene/propylene copolymer (SEP), styrene-butadiene (SB) and styrene-isoprene (SI).

In preparing the pressure-sensitive adhesive, if necessary an appropriate tackifier can be compounded with the pressure-sensitive adhesive for the purpose of controlling adhesive characteristics. Examples of the tackifier include terpene resins (e.g., α-pinene polymer, β-pinene polymer, diterpene polymer and α-pinene-phenol copolymer), hydrocarbon-based resins (e.g., aliphatic hydrocarbon, aromatic hydrocarbon, aliphatic-aromatic copolymer), rosins, coumarone indene resins, (alkyl)phenol resins and xylene resins.

Further, if necessary, the pressure-sensitive adhesive may further comprise an appropriate softening agent according to the base polymer used, such as low molecular polyisobutyrene and polybutene according to polyisobutyrene and paraffin oil according to A-B-A type block polymer, thereby controlling the adhesive properties and other properties thereof. In addition, appropriate additives such as fillers, pigments, antioxidants and stabilizers may be compounded with the pressure-sensitive adhesive, if necessary.

The substrate for supporting the pressure-sensitive adhesive layer is not particularly limited, and an appropriate fiber sheet obtained by agglomerating fibers into a sheet, such as non-woven fabric and woven fabric, can be used. Use of such a fiber sheet as the substrate makes it possible to prevent the residual sheet mark on the paint film of automobiles after the formation of the surface of the pressure-sensitive adhesive layer reflecting the roughness of the fibers and the peeling of the sheet. The prevention of the residual sheet mark is considered to be greatly attributable to cushioning property exerted by the fibers constituting the fiber sheet because, for example, it is difficult for the embossed substrate to prevent the residual sheet mark.

The fibers constituting the fiber sheet may be any appropriate fibers. A fiber having an excellent water resistance is preferable. Examples of such a fiber include fibers made of thermoplastic polymer such as polyolefin (e.g., polyethylene, polypropylene), polymer alloys thereof, polyester and polyamide, regenerated or semi-synthetic cellulose fibers such as rayon, cupro-ammonium rayon and cellulose acetate, natural fibers such as cotton, silk and wool, and mixture thereof (textile blend).

The fiber sheet which can be preferably used as a substrate is a non-woven fabric or non-woven fabric-like sheet or a non-woven fabric-based film having a laminate film provided on one or both surfaces thereof. Of those, a non-woven fabric-based film using a thermoplastic polymer fiber is preferable. The thickness of the fiber sheet is not particlarly limited. From the standpoint of strength, protection of the paint film of automobiles, prevention of deformation of the paint film due to stress developed at the edge of the sheet adhering to and covering the paint film, etc., a fiber sheet made of fiber aggregate having a weight of 500 g/m$^2$ or less, preferably 5 to 300 g/m$^2$, and more preferably 10 to 200 g/m$^2$, is preferably used.

The laminate film may be formed by an appropriate polymer. From the standpoint of flexibility, insusceptibility to wrinkling (partial peeling), ease of adhesion to the paint film of automobiles, etc., a film made of thermoplastic polymer exemplified above with reference to the fiber is preferable. In particular, a polyolefin film is preferable, in the case of taking into account the disposal by combustion after peeling.

The thickness of the laminate film can appropriately be determined. From the standpoint of function of protecting the paint film of automobiles from colliding matters, peelability of the protecting sheet from the paint film, follow-up performance to curved surfaces, reflection of the fiber structure onto the surface of the pressure-sensitive adhesive layer in the fiber sheet, etc., the thickness is preferably 5 to 40 μm. more preferably 7 to 35 μm, and most preferably 10 to 30 μm. The lamination of the film on the fiber aggregate can be carried out by any appropriate method such as heat fusion method and adhesion with an adhesive. From the standpoint of production efficiency, an extrusion lamination method involving fusion of film during extrusion is preferable.

The substrate used may be one having ultraviolet barrier properties. Such an ultraviolet barrier substrate is preferable in that it can fairly prevent the deterioration of the protecting sheet outdoor or under other severe conditions and can also prevent the deterioration of the pressure-sensitive adhesive layer by ultraviolet rays, making it possible to peel the protecting sheet easily and smoothly without breaking the substrate or leaving the paste of the pressure-sensitive adhesive layer even after prolonged use. The ultraviolet barrier substrate which is particularly preferable from such a standpoint of view is one having an ultraviolet transmission of 10% or less at a wavelength of 190 to 370 nm.

The ultraviolet barrier substrate can be produced by an appropriate method, e.g., a method by dispersing ultraviolet barrier particles in the entire or a part of a member constituting a fiber sheet, such as a fiber aggregate or a laminate film. Specific examples of such a method include a method which comprises applying a coating solution containing ultraviolet barrier particles to the surface of fibers or laminate film constituting the fiber sheet to form a coating film thereon, and a method which comprises forming the coating film on the surface of fibers prior to forming a fiber sheet, and then producing a fiber sheet such as fiber aggregate from those fibers having the coating film on the surface thereof.

Other examples of such a method include a method which comprises forming a polymer having ultraviolet barrier particles incorporated therein into fibers, and then producing a fiber aggregate from these fibers, or forming the polymer into a laminate film, so that the ultraviolet barrier particles are dispersed in the interior of the fiber sheet. The above-described methods may be used in combination.

The coating solution can be obtained as a dispersion obtained by mixing a binder component comprising an appropriate resin such as acrylic resin, urethane resin and polyester resin and ultraviolet barrier particles with an appropriate medium comprising, for example, an organic solvent such as toluene, or water. Examples of such a coating solution include commercially available products such as ZE-123 and ZR-100 (trade name, produced by Sumitomo Osaka Cement Co., Ltd.).

The application of the coating solution can be conducted by any appropriate method such as dipping, spraying, gravure coating and reverse coating. The thickness of the coating film may be appropriately determined. The thickness is generally 40 $\mu$m or less, preferably 20 $\mu$m or less, and more preferably 0.5 to 10 $\mu$m, from the standpoint of treatment efficiency and decrease in film thickness.

On the other hand, the formation of the fiber sheet having ultraviolet barrier particles dispersed therein can be conducted by any appropriate method such as a method which comprises mixing ultraviolet barrier particles and a thermoplastic polymer, forming the mixture into fibers by an appropriate fiber aggregating method such as melt blowing method and span bonding method, and then accumulating or knitting these fibers, or method which comprises subjecting the mixture to an appropriate film forming method such as T-die method and inflation method to form a laminate film.

The ultraviolet barrier particles used are appropriate particles that are capable of reflecting or absorbing ultraviolet rays, such as titanium white, red oxide, zinc white, alumina, tin oxide and carbon black. Of those ultraviolet barrier particles, white pigments such as titanium white and zinc white are particularly preferable from the standpoints of ultraviolet barrier effect, etc. The particle diameter of these ultraviolet barrier particles are appropriately determined, but it is generally 0.005 to 5 $\mu$m, preferably 0.01 to 1 $\mu$m, and more preferably 0.02 to 0.5 $\mu$m, in terms of an average particle diameter from the points of stability or long-term sustainability of dispersion state, etc. If necessary, the above ultraviolet barrier treatment can also be applied to the pressure-sensitive adhesive layer.

The formation of the sheet for protecting paint films of automobiles according to the present invention can be conducted according to conventional methods for forming adhesive sheets, for example, a method which comprises applying a solution of a pressure-sensitive adhesive in a solvent or a heat-melted liquid of a pressure-sensitive adhesive to the surface of a substrate, and a method which comprises forming a pressure-sensitive adhesive layer on a separator like the above method and then transferring the same onto the surface of a substrate. In this case, as mentioned above, the pressure-sensitive adhesive layer is preferably provided such that the surface of the pressure-sensitive adhesive layer can reflect the roughness or other structures developed by the fibers constituting the fiber sheet as much as possible.

Where the substrate has a laminate film on one surface thereof, the pressure-sensitive adhesive layer may be provided on either surface of the substrate. From the standpoint of reflection of the structure developed by the fibers constituting the fiber sheet onto the surface of the pressure-sensitive adhesive layer, the pressure-sensitive adhesive layer is preferably provided on the laminate film-free surface of the substrate. The thickness of the pressure-sensitive adhesive layer thus formed may be appropriately determined, and it is generally 3 to 100 $\mu$m, preferably 3 to 70 $\mu$m, and more preferably 5 to 50 $\mu$m. If necessary, the pressure-sensitive adhesive layer may be protected until practical use by temporarily bonding a separator or the like thereto.

The sheet for protecting paint films of automobiles according to the present invention is preferably used to protect the surface of the bodies or parts such as bumper of automobiles coated with a coating material such as polyester-melamine-based coating material, alkyd-melamine-based coating material, acryl-melamine-based coating material, acryl-urethane-based coating material and acryl-polyacid hardener-based coating material.

In particular, the sheet for protecting paint films of automobiles according to the present invention can advantageously be used in the case that acid rain or a chemical liquid such as an acidic liquid is liable to penetrate since adhesion-covering the paint film of automobiles is conducted outdoor or in the factory, or in the case that acid rain or a cleaning liquid such as window washer is liable to penetrate into the interface between the protecting sheet and the paint film of automobiles during outdoor storage.

The present invention will be described in more detail by reference to the following examples, but the present invention should not be construed as being limited thereto. Unless otherwise indicated, all parts are by weight.

EXAMPLE 1

A toluene solution of a rubber-based pressure-sensitive adhesive made of a mixture of 90 parts of a polyisobutyrene having a viscosity average molecular weight of 1,000,000 and 10 parts of a polyisobutyrene having a viscosity average molecular weight of 80,000 was applied to one surface of a polyethylene-made non-woven fabric having a basis weight of 60 g/m$^2$, and then dried at a temperature of 70° C. for 3 minutes to obtain a sheet for protecting paint films of automobiles comprising an pressure-sensitive adhesive layer having a thickness of 15 $\mu$m. The surface of the pressure-sensitive adhesive layer had Ra of 10 $\mu$m and Rmax of 80 $\mu$m and had a continuous groove developed by the entanglement of short fiber-like grooves reflecting the fiber structure of non-woven fabric.

EXAMPLE 2

Using an extrusion lamination method, a 20 $\mu$m thick polypropylene film having a titania content of 10% by weight was laminated on one surface of a polypropylene-made non-woven fabric having a basis weight of 40 g/m² and a 20 μm thick polyethylene film having a titania content of 10% by weight was laminated on the other surface thereof to prepare a substrate. A pressure-sensitive adhesive layer was then provided on the polypropylene side of the substrate in the same manner as in Example 1 to obtain a sheet for protecting paint films of automobiles. The surface of the pressure-sensitive adhesive layer had Ra of 6 μm and Rmax of 65 μm and had a continuous groove developed by the entanglement of short fiber-like grooves reflecting the fiber structure of non-woven fabric.

EXAMPLE 3

A sheet for protecting paint films of automobiles was obtained in the same manner as in Example 1 except for using a polypropylene-made non-woven fabric having a basis weight of 150 g/m². The surface of the pressure-sensitive adhesive layer had Ra of 12 μm and Rmax of 100 μm and had a continuous groove developed by the entanglement of short fiber-like grooves reflecting the fiber structure of non-woven fabric.

EXAMPLE 4

A sheet for protecting paint films of automobiles was obtained in the same manner as in Example 1 except that a polyethylene film having a thickness of 50 μm which had been embossed to have Ra of 10 μm was used as a substrate in place of the polypropylene-made non-woven fabric. The surface of the pressure-sensitive adhesive layer had an embossed structure such that Ra was 10 μm and Rmax was 50 μm. Grooves based on the embossed structure were discontinuously scattered on the surface of the pressure-sensitive adhesive layer.

EXAMPLE 5

A sheet for protecting paint films of automobiles in which the pressure-sensitive adhesive layer had a surface roughness of 1 μm in terms of Ra and 10 μm in terms of Rmax was obtained in the same manner as in Example 1 except that the polyethylene-made non-woven fabric was replaced by a polyethylene film having a thickness of 50 μm. The pressure-sensitive adhesive layer had substantially a smooth surface.

EVALUATION TEST

The sheets for protecting paint films of automobiles obtained in the Examples each were subjected to the following tests.

Diffusibility of Dirty Water

As shown in the Figure, a sheet A (50 mm×50 mm) for protecting paint films of automobiles was adhered to the surface of a transparent acrylic resin plate B while forming a wrinkle at the central portion thereof to form a wrinkle portion S (W: 10 mm; L: 40 mm). The resin plate was being kept vertical and 0.3 ml of a window washer having an ethylene glycol content of 5% by weight was then poured into the wrinkle portion. The resin plate was allowed to stand at 23° C. for 1 hour, and diffusion state of the washer was examined.

Staining Property and Sheet Mark Property of Paint Film

According to the above dirty water diffusibility test, a sheet for protecting paint films of automobiles was adhered to an acryl-melamine paint-coated iron plate in a wrinkle formation state. The window washer was then poured into the wrinkled portion. The plate was allowed to stand at 23° C. for 1 hour, at 40° C. for 3 hours and then at 60° C. under a relative humidity of 95% for 16 hours. The sheet for protecting paint films of automobiles was peeled off the iron plate, the iron plate was then allowed to stand at 60° C. under a relative humidity of 95% for 8 hours to examine discoloration of the paint film and also examine adhesive mark of the sheet on the paint film.

The results obtained are shown in the Table below.

TABLE

| Example No. | Ra (μm) | Rmax (μm) | Diffusibility of dirty water | Staining property | Adhesive mark |
|---|---|---|---|---|---|
| 1 | 10 | 80 | Widely diffused | None | None |
| 2 | 6 | 65 | Widely diffused | None | None |
| 3 | 12 | 100 | Widely diffused | None | None |
| 4 | 10 | 50 | Widely diffused | None | Occurred*1 |
| 5 | 1 | 10 | Retained in wrinkle portion | Occurred*2 | None |

*1Occurrence of embossed marks
*2Discolored along wrinkle portion

As can be seen in the above Table, the sheets for protecting paint films of automobiles according to the present invention can allow penetrated dirty water to be well diffused without retaining the same and prevent damages such as discoloration on the paint film of automobiles. The sheets for protecting paint films of automobiles according to the present invention also stably protects the paint films and has a good peelability, thus being excellent in practical use. In particular, the protecting sheet of Example 2, which comprises ultraviolet barrier particles incorporated therein, can well maintain its initial properties and exhibits an excellent peelability even after use under conditions that the sheet is easily exposed to ultraviolet rays.

While the invention has been described in detail and with reference to specific embodiments thereof, it will be apparent to one skilled in the art that various changes and modifications can be made therein without departing from the spirit and scope thereof.

What is claimed is:

1. A sheet for protecting paint films of automobiles, comprising a pressure-sensitive adhesive layer having a roughened surface provided on a substrate made of fiber sheet, said roughened surface being opposite from a surface of the adhesive layer facing the substrate, and said roughened surface reflecting a shape of the fibers of the fiber sheet constituting the substrate.

2. The sheet for protecting paint films of automobiles as claimed in claim 1, wherein said pressure-sensitive adhesive layer is satisfied with at least one of the requirements that the surface roughness thereof is 2 μm or more based on Ra, and 20 μm or more based on Rmax.

3. The sheet for protecting paint films of automobiles as claimed in claim 1 or 2, wherein said pressure-sensitive adhesive layer having the roughened surface is formed on the substrate directly or through a film layer.

4. The sheet for protecting paint films of automobiles as claimed in claim 3, wherein said fiber sheet comprises a white pigment incorporated in at least one of said film layer and a non-woven fabric as the fiber sheet.

* * * * *